April 24, 1934. N. R. KRAUSE 1,956,072
GREASE GUN
Filed Aug. 29, 1932 3 Sheets-Sheet 1
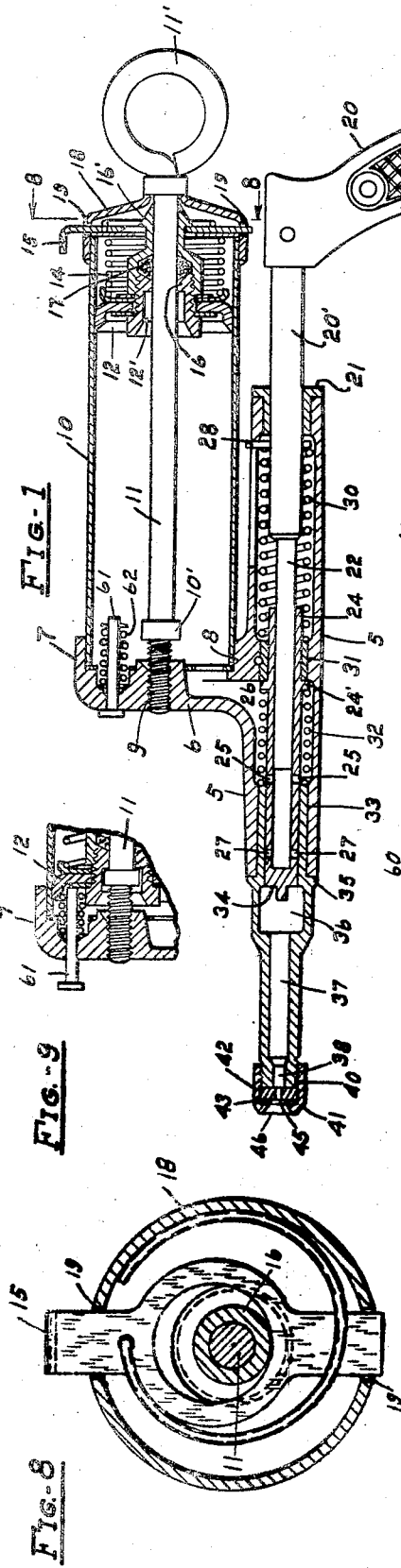
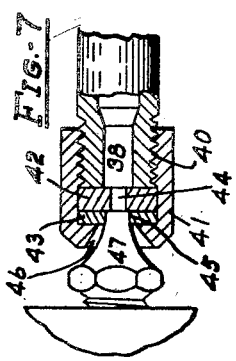
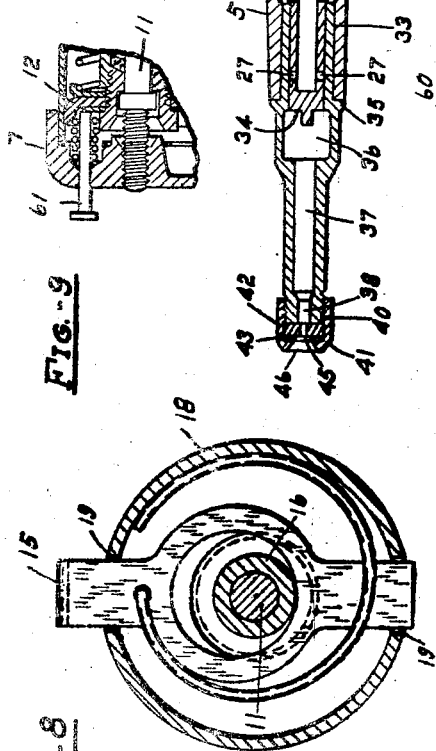
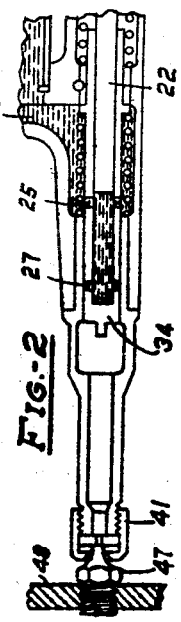
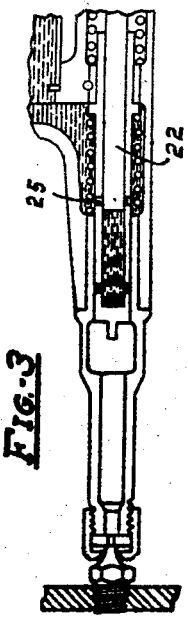
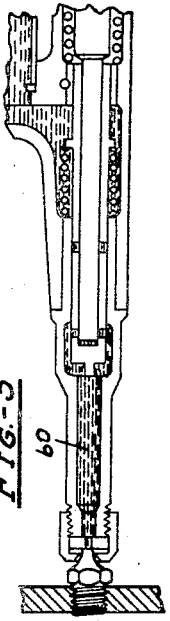
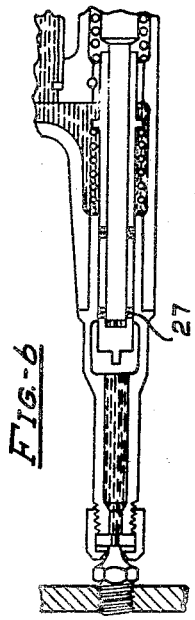
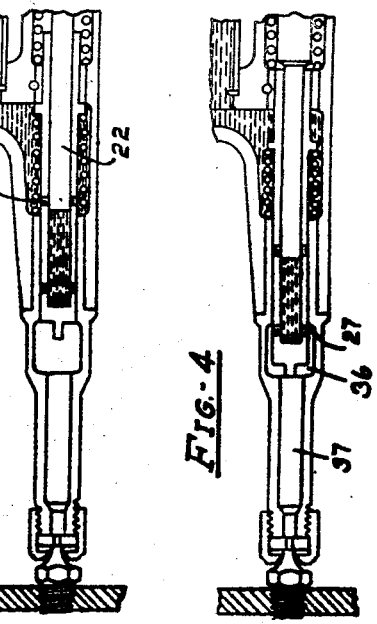
INVENTOR.
NORMAN R. KRAUSE
BY *James A. Walsh*
ATTORNEY

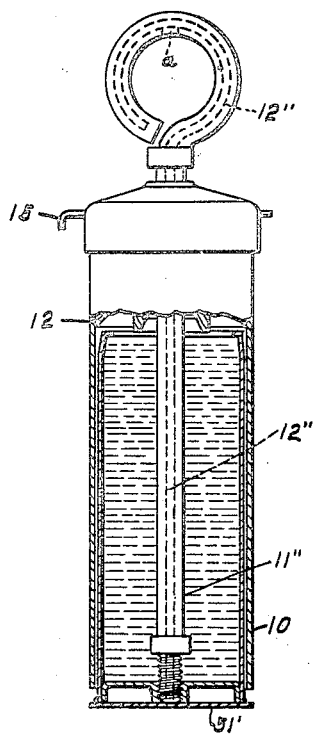
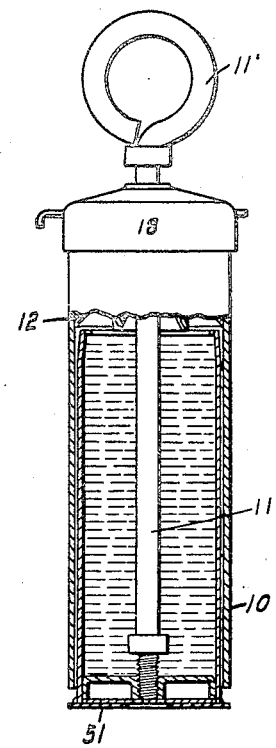
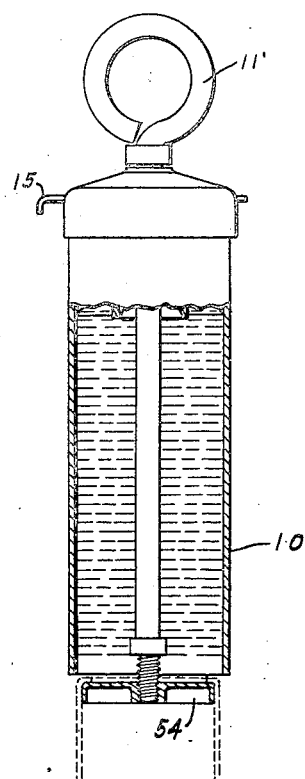
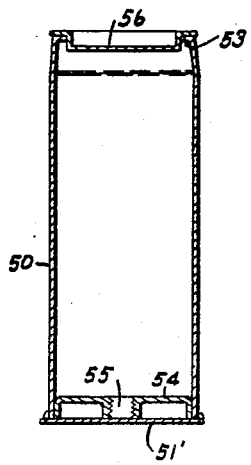
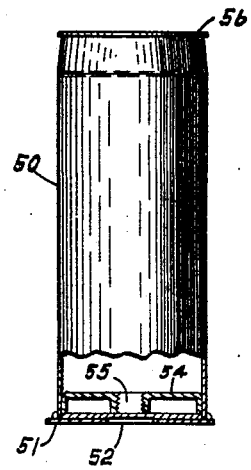

INVENTOR.
NORMAN R. KRAUSE
BY James A. Walsh
ATTORNEY

Patented Apr. 24, 1934

1,956,072

UNITED STATES PATENT OFFICE 1,956,072

GREASE GUN

Norman R. Krause, Racine, Wis.

Application August 29, 1932, Serial No. 630,819

19 Claims. (Cl. 221—47.4)

My invention relates to lubricant dispensers of the grease pump type, my object being to provide a device by which lubricant may be projected under pressure to apertures or fittings of various types associated with machine parts for the proper lubrication of same. Its purpose is to project a regulated flow of lubricant without the presence of voids to receiving elements and further includes nozzle contact means which permits the transmission of lubricant to the receiving elements without leakage. A further object is to simplify the loading of such pumps with lubricant, which I may either accomplish by a reservoir forming part thereof to be filled and refilled with bulk lubricant from a source of supply, as a barrel or otherwise, by the mechanism of the reservoir itself, or such reservoir may be readily loaded from cartridges of lubricant, which may be quickly inserted and dispensed with when emptied, such cartridges to be carried in stock as a staple article of commerce and sold to the user in quantities as desired and thereby obviating the necessity of purchasing large quantities of lubricant and storing the same indefinitely until the lubricant has been used. As will be apparent, by supplying such lubricant in sealed cartridges, exposure thereof to extraneous matter is entirely eliminated, and when discharged from the pump it will be in precisely the same clean condition in which it has been canned in the original cartridge. A further object is to generally improve such pumps to simplify the construction and application thereof, and to render them more trouble-proof, cleaner in handling and efficient in use, as will hereinafter appear.

Figure 15:
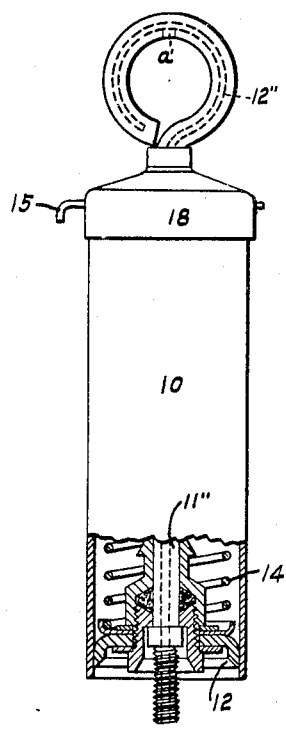

In the accompanying drawings, forming part hereof, Figure 1 is a longitudinal sectional view of my improved pump; Figs. 2, 3, 4, 5 and 6 are detail views indicating the cycle of the piston stroke and the movements of the floating cylinder which I employ; Fig. 7, an enlarged detail of the nozzle applied to a fitting; Fig. 8, a detail of the rear portion of the reservoir taken on the dotted line 8—8 in Fig. 1; Fig. 9, a detail of the pump-head showing an indicator projecting therefrom; Fig. 10, a detail sectional view of the reservoir detached from the pump and indicating a cartridge inserted therein preparatory to loading the reservoir; Fig. 11, an elevation of a cartridge of the character indicated in Fig. 10; Fig. 12, a detail sectional view of the reservoir after having been loaded and the cartridge in position to be removed, Fig. 13, a detail section of the reservoir and a modified form of cartridge which I may employ; Fig. 14 is a sectional elevation of said modified form of cartridge; Fig. 15, a fragmentary elevation of the reservoir showing the position of the plunger and its rod when arranged for loading the reservoir with lubricant directly from a container, Fig. 16, a similar view indicating the operation of pulling the plunger rearwardly for withdrawing the lubricant by suction; Fig. 17, an elevation of a well known can of commerce with the reservoir inserted in the lubricant therein to fill the same by pressure against the movable lid of the can; and Fig. 18 is a fragmentary elevation of the same type of can with the reservoir applied thereto and the plunger in the act of withdrawing lubricant therefrom by suction upon pulling the plunger-rod outwardly.

In said drawings the numeral 5 indicates the pump body including a head 6, said parts being preferably integrally formed, and which body and head embody flanged portions 7 and 8 respectively for receiving an open-ended preferably cylindrical reservoir 10 which fits therein, and also a threaded portion 9 for connecting a plunger-rod 11 thereto and by which rod the reservoir is detachably secured to the pump-head, as will hereinafter appear. Within said reservoir 10 I position a sliding plunger 12 of any suitable character, which plunger is normally urged toward the discharge end of the reservoir 14 acting against the rear side of the plunger and is latched by a keeper 15, the plunger comprising a bearing 16 having a tapered end 16' in which the plunger-rod is freely mounted, said bearing also including a stuffing-box 17 for preventing escape of grease through the rear end of the pump, and which parts are secured by a cap 18 having slots 19 therein in which the latch 15 is movably mounted.

In the pump body 5 I mount a pistol-handled piston 20, the enlarged portion 20' of which passes through a bearing 21, which portion terminates in a reduced member 22, the latter being slidably seated in a floating cylinder 24 embodying ports 25 communicating with a passageway 26 formed in the pump-head, and which cylinder at its forward end is further provided with ports 27 for a purpose to appear. A stop-pin 28 on the rod 20' prevents the handle 20 from turning, and a spring 30 encircles a portion of the large and smaller members of said piston, abutting at its rear end against the stop-pin 28 while its forward end abuts a fixed bushing 31 for the cylinder 24, said cylinder being shouldered at 24' to form a stop against bushing 31 and an abutment for a coil spring 32, the opposite end of the latter bearing against a nozzle 33 insertible within the pump body and surrounding the floating cylinder 24 and which is provided with a closed head 34. The nozzle 33 is shouldered, at 35, to fit and abut the pump body, and includes an enlarged chamber 36 from which an orifice 37 extends and is reduced in form at its end 38, the end of the nozzle having a screw-threaded portion 40 for receiving a cap 41 which encloses washers 42, 43, of resilient material, the washer 42 having a smaller outlet 44 than the outlet 45 in washer 43, said washers being clamped directly between the face of conduit 40 and cap 41. The cap 41 embodies a centering opening 46 adapted to be placed over a fitting 47 secured to a machine at 48, in a well known manner, and by employing washers of suitable resilient material I am enabled to tightly contact the fitting 47 whether the same has a smooth or marred surface.

As indicated, I may charge the reservoir 10 with grease directly from a source of bulk supply, or provide such supply from commercial cartridges or cans, and for the latter purpose employ a cartridge 50 of sheet metal having a flanged bottom 51 embodying an opening 52 therethrough, and a flanged opening having a lip 53. In the bottom of such cartridge I place a supplemental cup-shaped bottom 54 having a centrally located threaded aperture 55 adapted to receive the threaded end of the plunger-rod 11, and when said cartridge is filled with grease I securely retain the latter therein by a readily removable press cover 56, and which canned grease of predetermined quantity, as stated, may be marketed as a staple article of commerce.

Figure 16:
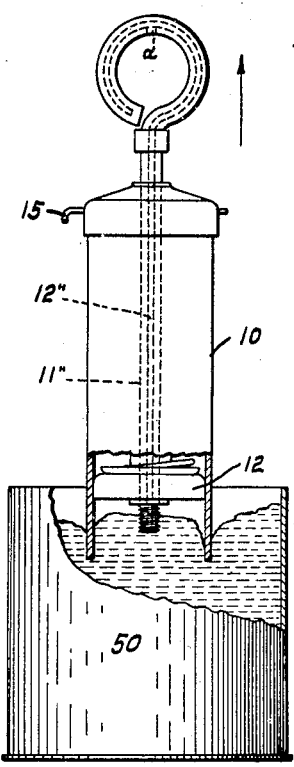
Figure 17:
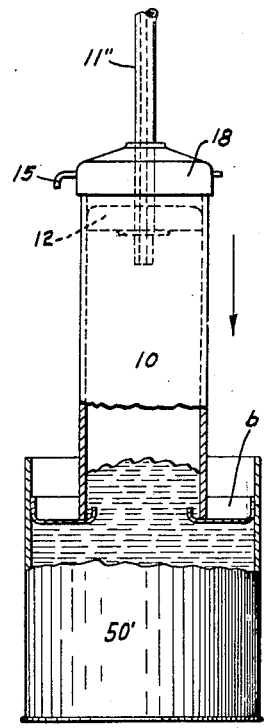
Figure 18:
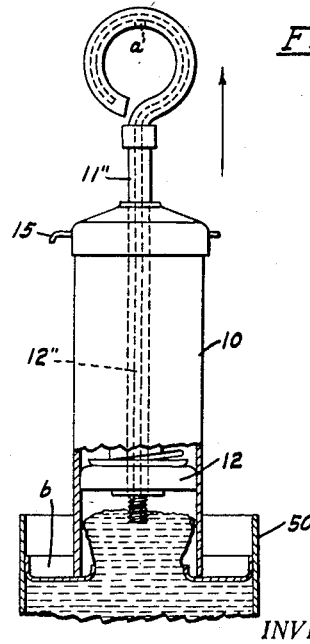

When it is desired to fill the reservoir 10 from a bulk supply of grease said reservoir is removed bodily from the pump-head 6, Fig. 1, by unscrewing the plunger-rod 11 from the head by means of its handle 11', when the rod, plunger and reservoir are to be handled as a unit, as shown in Figs. 15 to 18 inclusive. The open end of the reservoir is then inserted in the bulk lubricant as indicated in Fig. 16, or against the lid b of the commercial can 50', Fig. 18, when such a container is employed, and by pulling the rod 11" the plunger 12 will gradually become retracted to the position indicated in dotted lines in Fig. 17. As the plunger is thus drawn rearwardly a vacuum is created in the reservoir, which draws the lubricant from the container into the reservoir in a well known manner and thereby causing the latter to be filled, when the assembled reservoir and plunger may be replaced on and secured to the head in readiness for co-operation with the remainder of the pump. It will be further understood that the reservoir may be applied to the lid b on the can 50' in the manner indicated in Fig. 17, and by retracting the plunger and applying pressure to the cap 18 the reservoir will force the movable lid b inwardly so that the lubricant will flow through the opening in the lid and fill the reservoir.

When loading the reservoir from a cartridge of the character shown in Figs. 10 and 11, having an opening in the bottom thereof, the plunger-rod 11 is manipulated to disconnect the reservoir complete from the pump-head 6, and by then pulling the rod rearwardly against the plunger 12 the latter compresses spring 14 until the tapered end 16' of bearing 16 engages latch 15, which securely retains the plunger in its retracted position, and when thus locked the plunger-rod 11 is free to move independently of the plunger. The cover 56 is then removed from the cartridge and the latter inserted in the reservoir 10, when the plunger-rod is pushed through the grease and its threaded end screwed into the supplemental bottom 54 as shown in Fig. 10, whereupon the operator, grasping the cartridge with one hand, pulls the latter out of the reservoir, as shown by dotted lines in Fig. 12, and then rotates the cartridge so that the supplemental bottom will be unscrewed from the rod 11, and, as the upper end of the cartridge converges, its lip 53 will prevent said bottom from leaving the emptied cartridge by the frictional engagement of said parts. It will be apparent that as the cartridge is caused to move away from the supplemental bottom a vacuum will be created therein, if no air is admitted, which would prevent movement of the cartridge, and therefore in providing the apertured bottom in the cartridge air is admitted therethrough to relieve such vacuum as the cartridge is withdrawn.

It will thus be seen that the contents of the cartridge are readily transferred to the reservoir in a simple and clean manner without soiling the hands, and that when disconnected the empty cartridge may be dispensed with in like manner as cans for other goods.

In the modified form of cartridge, Figs. 13 and 14, I employ a closed bottom 51' and a plunger-rod 11' having an air-duct 12" passing through the entire length thereof and communication with the atmosphere by an opening a so that sufficient air supply will be provided for carrying out the operation of displacing the contents of the cartridge in the manner already described. In this modified form, however, when loading bulk grease directly into the reservoir the opening a is closed by the finger when pulling the rod, which prevents air from entering thereinto.

After the reservoir is completely charged with grease from a bulk supply or from a cartridge it is inserted into the pump-head 6 and locked to position by the threaded plunger rod 11 at 9, as indicated in Fig. 1, and upon depressing the latch 15 the plunger is released, and through the constant expanding force of spring 14 said plunger will produce sufficient pressure on the grease to cause it to flow into the pumping mechanism through the duct 26 communicating with the floating cylinder 24. In applying the pump to an aperture or fitting 47 as is common the operator grasps the handle 20 and contacts the end 46 of the nozzle with the receiving fitting 47 as clearly shown in Fig. 7, and as the disks 42, 43, are of resilient character and apertured in relation to each other as stated a leak-proof connection between said parts is established and in practice I have demonstrated, as indicated, that the resilient face of the nozzle will make proper contact in relation to a smoothly finished fitting or one which has become marred from frequent use.

In Fig. 2 the floating cylinder and piston are shown in their normal retracted positions, the lubricant 60 being under pressure in the reservoir and passing therefrom through duct 26 into the intake ports 25 and thence to the interior of the cylinder, and through pushing of the handle 20 the reduced portion 22 of the piston is caused to move forward to close said intake ports, as indicated in Fig. 3. The cylinder is thus charged with grease, which is trapped therein, and further movement of the piston causes the cylinder and contents to move against the resistance of spring 32 and compressing the same, Fig. 4, and as the piston movement continues the discharge ports 27 of the cylinder are opened to the nozzle duct 36, 37, which communicates through the washers 42, 43, with the fitting to be charged.

As the discharge ports 27 become exposed the grease trapped within the cylinder is displaced by the piston 22 in its continued forward movement and is forced into the receiving fitting as indicated in Fig. 5. When the operator desires the piston to return to normal position the pressure upon the handle 20 is released when the piston and cylinder retract simultaneously to the position indicated in Fig. 1. However, after the piston has moved rearwardly a slight distance the discharge ports 27 in the cylinder are closed, as shown in Fig. 6, while the cylinder continues to move rearwardly until its shoulder 24' abuts the bearing 31, and as the piston also continues to move rearwardly through the influence of spring 30 a vacuum is created within said cylinder 24, so that as said piston travels to the position shown in Fig. 2 and opening the intake ports 25 the grease in the reservoir urged by the plunger 12 will be instantly drawn into the cylinder. By thus employing the combined vacuum and pressure means for charging the floating cylinder I produce in practice a highly efficient pumping system, and in utilizing said floating cylinder in the manner stated a valve system is provided which cannot become inoperative because of small particles of grit or other foreign matter lodging at some vital point within the structure. And further, in employing a floating cylinder I am enabled to maintain constant pressure upon the grease in the reservoir and at the same time prevent the escape of the grease through the nozzle when the piston is in its normal retracted position. As the contents of the reservoir are being slowly discharged by successive strokes of the pumping mechanism the plunger 12 is gradually moving toward the pump-head 6, and at a predetermined point it will come in contact with an indicator pin 61 normally held in closed position by a spring 62. As the plunger 12 continues to move it forces the pin 61 out to the position indicated in Fig. 9 and enables the operator to readily observe when the contents of the reservoir have been discharged and requires replenishment.

I claim as my invention:

1. In a pump having a body and a head including an intercommunicating duct, a reservoir connected to the head, means for supplying material from the reservoir to the pump body through said duct, a floating cylinder in the body having an intake port communicating with the duct and a discharge port, a nozzle on the body, and a piston in the body and extending into the cylinder for controlling its intake port and pumping lubricant through the cylinder outlet into the nozzle.

2. In a pump, a body having a chamber therein, a floating cylinder in the chamber having intake and discharge ports and a head at its outer end adjacent the discharge port, means for supplying lubricant to the cylinder, and a piston in the cylinder for closing said intake port and pumping lubricant from the cylinder behind its head and through the discharge port thereof.

3. In a pump, a body having a chamber therein, a floating cylinder in the chamber having an intake port and a discharge port and a closed outer end, means for supplying lubricant to the cylinder through its intake port, and a piston in the cylinder for closing said intake port to trap material between its end and the outer end of the cylinder and projecting the lubricant from the cylinder through its outlet.

4. In a pump, a body having a chamber therein, a spring controlled floating cylinder in the chamber having an intake port and a closed outer end, means for supplying fluid to the cylinder, and a piston in the cylinder for closing said port and pumping fluid from the cylinder behind its head.

5. In a pump, a body having a chamber therein, a floating cylinder in the chamber having intake and discharge ports and an imperforate head adjacent the discharge port, means for supplying fluid to the cylinder, and a spring controlled piston in the cylinder for closing said intake port and pumping fluid from the cylinder through its discharge port.

6. In a pump, a body having a chamber therein, a floating cylinder in the chamber having its outer end closed and embodying an intake port and a discharge outlet, means for supplying lubricant to the cylinder through its intake port, yielding means associated with the cylinder for controlling its movements, and a piston in the cylinder for closing said intake port to periodically trap lubricant between the end of the piston and the closed end of the cylinder and pumping the trapped lubricant from the cylinder through its outlet.

7. In a pump, a body having a chamber therein, a floating cylinder in the chamber having a closed outer end and an intake port and a discharge outlet, and a piston yieldingly mounted in the chamber, its end terminating in relation to the closed outer end of the chamber to form a lubricant retaining receptacle communicating with said ports and reciprocable in the cylinder for closing said intake port and pumping lubricant from the cylinder through its outlet.

8. In a pump, a body having a chamber therein, a floating cylinder in the chamber having substantially transversely arranged inlet and discharge ports, means for supplying lubricant to the cylinder, a nozzle supporting the cylinder and extending from the body, an apertured resilient contact member at the end of the nozzle, a cap on the nozzle for securing the contact member between it and the face of the nozzle, said cap having a central opening to engage a receiving element, said opening registering with the aperture in the contact member, and a piston in the chamber and extending into the cylinder for closing its intake port and projecting lubricant from the cylinder through said nozzle, contact member and cap.

9. In a pump, a body having a chamber therein, a floating cylinder in the chamber having inlet and discharge ports, means for supplying lubricant to the cylinder, a nozzle supporting the cylinder and extending from the body, resilient contact members at the end of the nozzle having aligned openings therein one smaller than the other, a cap for securing the members on the nozzle, said cap having a centering opening registering with the opening in the contact member, and a piston in the chamber and extending into the cylinder for closing its inlet port and pumping lubricant from the cylinder through the nozzle, contact members and cap.

10. A pump of the character described comprising a chambered body and a head having an intercommunicating duct therebetween, a lubricant containing reservoir secured to the head, a cylinder in the body having intake and discharge ports, a piston in the cylinder for closing the inlet and discharging lubricant from the cylinder through the discharge port, and means in the reservoir for forcing lubricant through said duct and into the cylinder as said piston is being reciprocated.

11. A pump comprising a chambered body and a head having an intercommunicating duct therebetween, a lubricant containing reservoir secured to the head, a floating cylinder in the body having a closed outer end and intake and discharge ports, means for supplying lubricant from the reservoir to the cylinder through said duct, and a yieldingly mounted piston reciprocable in the cylinder for pumping lubricant from the latter.

12. In a pump having a body embodying a duct, a lubricant reservoir mounted on the body in parallel relation thereto and communicating with the duct, means in the reservoir for withdrawing lubricant from a retainer into the reservoir, a floating cylinder communicating with the duct, and a reciprocating piston in the cylinder for controlling the inflow of lubricant from the reservoir to the cylinder and discharging the lubricant through a nozzle.

13. In a pump having a body embodying a duct, a lubricant containing reservoir positioned in parallel relation to the body, a yieldingly mounted plunger in the reservoir, means for retaining the plunger in retracted position while the reservoir is being filled with lubricant, means for releasing the plunger to impart pressure against the lubricant to eject the latter through said duct, a floating cylinder communicating with the duct, and a piston in the cylinder for discharging inflowing lubricant therefrom.

14. The combination, with a pump, of means for supplying lubricant thereto, a floating cylinder communicating with said means comprising a port for receiving lubricant therefrom and a port for discharging such lubricant said cylinder having an imperforate head, and a piston in the cylinder adapted to reciprocate and to intermittently charge the space between its end and the cylinder head for trapping lubricant prior to its discharge through said discharge port.

15. A pump comprising a body and a head having an intercommunicating duct therebetween, a removable lubricant containing reservoir secured to the head, a floating ported cylinder in the body, means for supplying lubricant from the reservoir to the cylinder through said duct, and a non-rotatable piston reciprocable in the cylinder for pumping lubricant from the latter.

16. A pump comprising a body and a head having an intercommunicating duct therebetween, a lubricant containing reservoir secured to the head, means associated with the body for indicating the amount of lubricant in the reservoir, means associated with the reservoir for actuating the indicating means, a floating ported cylinder in the body, means for supplying lubricant from the reservoir to the cylinder through said duct, and a piston reciprocable in the cylinder for pumping lubricant from the latter.

17. A pump comprising a body and a head having an intercommunicating duct, a lubricant containing reservoir secured to the head, a floating ported cylinder in the body communicating with the duct, a handled piston in the body and extending into the cylinder for pumping lubricant from the latter, and means for preventing the piston from turning when operating the pump.

18. A pump comprising a body and a head having an intercommunicating duct therebetween said body extending beyond the head, a nozzle secured to the forward portion of the body, a floating ported cylinder supported by the nozzle, and a piston in the cylinder for controlling the inflow of lubricant from the duct and ejecting the lubricant into the nozzle.

19. A pump comprising a body and a head having an intercommunicating duct therebetween said body extending beyond the head, a nozzle secured to the forward portion of the body, a floating ported cylinder supported by the nozzle and communicating with said duct and the nozzle, and a spring retracted piston in the cylinder for controlling the inflow of lubricant from the duct and ejecting said lubricant into the nozzle.

NORMAN R. KRAUSE.